United States Patent
Eickemeyer et al.

(10) Patent No.: US 10,795,683 B2
(45) Date of Patent: Oct. 6, 2020

(54) PREDICTING INDIRECT BRANCHES USING PROBLEM BRANCH FILTERING AND PATTERN CACHE

(71) Applicant: International Business Machines Corporation, Armonk, NY (US)

(72) Inventors: Richard J. Eickemeyer, Rochester, MN (US); Tejas Karkhanis, White Plains, NY (US); Brian R. Konigsburg, Austin, TX (US); David S. Levitan, Austin, TX (US); Douglas R. G. Logan, Austin, TX (US); Mauricio J. Serrano, Bronx, NY (US)

(73) Assignee: International Business Machines Corporation, Armonk, NY (US)

(*) Notice: Subject to any disclaimer, the term of this patent is extended or adjusted under 35 U.S.C. 154(b) by 784 days.

(21) Appl. No.: 14/301,936

(22) Filed: Jun. 11, 2014

(65) Prior Publication Data

US 2015/0363201 A1    Dec. 17, 2015

(51) Int. Cl.
  *G06F 9/38*   (2018.01)
  *G06F 9/30*   (2018.01)

(52) U.S. Cl.
  CPC ........ *G06F 9/3848* (2013.01); *G06F 9/30061* (2013.01); *G06F 9/3806* (2013.01); *G06F 9/3832* (2013.01); *G06F 9/3844* (2013.01)

(58) Field of Classification Search
  CPC ... G06F 9/30061; G06F 9/3848; G06F 9/3844
  See application file for complete search history.

(56) References Cited

U.S. PATENT DOCUMENTS

| 5,933,628 | A | * | 8/1999 | Chang | G06F 8/4451 |
| | | | | | 712/233 |
| 6,170,053 | B1 | * | 1/2001 | Anderson | G06F 9/3806 |
| | | | | | 712/240 |
| 6,601,161 | B2 | | 7/2003 | Rappoport et al. | |
| 6,721,877 | B1 | * | 4/2004 | Chen | G06F 9/3806 |
| | | | | | 712/239 |
| 6,823,447 | B2 | | 11/2004 | Hay et al. | |

(Continued)

FOREIGN PATENT DOCUMENTS

| EP | 2024815 | 11/2012 |
| WO | WO2007131032 A2 | 11/2007 |

OTHER PUBLICATIONS

Sendag, R., et al., "Branch Misprediction Prediction: Complementary Branch Predictors," IEEE Computer Architecture Letters, Jul.-Dec. 2007, pp. 49-52, vol. 6, No. 2.

Jourdan, S., et al., "The Effects of Mispredicted-Path Execution on Branch Prediction Structures," Proceedings of PACT '96 (Oct. 1996 IEEE), pp. 58-67.

(Continued)

*Primary Examiner* — Keith E Vicary
(74) *Attorney, Agent, or Firm* — Scully, Scott, Murphy & Presser, P.C.; Kurt P. Goudy, Esq.

(57) ABSTRACT

Predicting indirect branch instructions may comprise predicting a target address for a fetched branch instruction. Accuracy of the target address may be tracked. The fetched branch instruction may be flagged as a problematic branch instruction based on the tracking. A pattern cache may be trained for predicting a more accurate target address for the fetched branch instruction, and the next time the fetched branch instruction is again fetched, a target address may be predicted from the pattern cache.

8 Claims, 6 Drawing Sheets

(56) References Cited

U.S. PATENT DOCUMENTS

| | | | |
|---|---|---|---|
| 7,797,521 | B2 | 9/2010 | Eickemeyer et al. |
| 7,870,371 | B2 | 1/2011 | Mutlu et al. |
| 8,312,255 | B2 | 11/2012 | Sendag |
| 2001/0016903 | A1* | 8/2001 | Tremblay ............... G06F 9/3844 712/239 |
| 2003/0212882 | A1* | 11/2003 | Bonanno ............... G06F 9/3806 712/238 |
| 2004/0172534 | A1 | 9/2004 | Ogata |
| 2006/0242393 | A1* | 10/2006 | Park .................... G06F 9/30061 712/240 |
| 2007/0174555 | A1* | 7/2007 | Burtscher ............. G06F 9/3851 711/137 |
| 2007/0239974 | A1* | 10/2007 | Park ...................... G06F 9/3806 712/238 |
| 2008/0307210 | A1 | 12/2008 | Levitan et al. |
| 2009/0164766 | A1* | 6/2009 | Suggs .................... G06F 9/3848 712/240 |
| 2009/0172371 | A1* | 7/2009 | Joao ....................... G06F 9/3842 712/240 |
| 2011/0078425 | A1* | 3/2011 | Shah ..................... G06F 9/3806 712/239 |
| 2011/0320792 | A1* | 12/2011 | Bonanno ............... G06F 9/3848 712/240 |
| 2012/0005462 | A1* | 1/2012 | Hall ....................... G06F 9/3808 712/239 |
| 2012/0079255 | A1* | 3/2012 | Combs .................. G06F 9/3848 712/239 |
| 2013/0311760 | A1* | 11/2013 | Kothari ................. G06F 9/3806 712/240 |
| 2014/0019737 | A1* | 1/2014 | Hilton ................... G06F 9/3806 712/239 |
| 2014/0281441 | A1* | 9/2014 | Manoukian ........... G06F 9/3844 712/239 |
| 2015/0046690 | A1* | 2/2015 | Eickemeyer .......... G06F 9/3844 712/239 |

OTHER PUBLICATIONS

Chang, P.-Y., et al., "Improving Branch Prediction Accuracy by Reducing Pattern History Table Interference," Proceedings of PACT '96 (IEEE Oct. 1996), pp. 48-57.

Stark, J., et al., "Variable Length Path Branch Prediction", ACM SIGPLAN Notices, 1998, 11 pages, 33(11):170-179.

McFarling, S., "Combining Branch Predictors", WRL Technical Note TN-36, Jun. 1993, pp. 1-25, Western Research Laboratory, Palo Alto, CA.

Tarlescu, M-D., et al., "Elastic History Buffer: A Low-Cost Method to Improve Branch Prediction Accuracy", Proceedings of the 1997 IEEE International Conference on Computer Design (ICCD'97), Oct. 12-15, 1997, pp. 82-87, Austin, Texas.

Evers, M., et al., "Using hybrid branch predictors to improve branch prediction accuracy in the presence of context switches", ACM SIGARCH Computer Architecture News—Special Issue: Proceedings of the 23rd annual international symposium on Computer architecture (ISCA '96), May 1996, pp. 3-11, vol. 24, Issue 2.

Michaud, P., et al., "Skewed Branch Predictors", IRISA, No. 2978, Sep. 1996, pp. 1-18.

Juan, T., et al., "Dynamic history-length fitting: a third level of adaptivity for branch prediction" Published in: Computer Architecture, 1998. Proceedings. The 25th Annual International Symposium on Jun. 27-Jul. 1, 1998 pp. 155-166.

Sprangle, E., et al., "The agree predictor: a mechanism for reducing negative branch history interference", ACM SIGARCH Computer Architecture News—Special Issue: Proceedings of the 24th annual international symposium on Computer architecture (ISCA '97), May 1997, pp. 284-291, vol. 25 Issue 2.

Parihar, "Branch Prediction Schemes," www.ece.rochester.edu/~parihar/pres/Pres_BranchPrediction-Survey.pdf, Mar. 7, 2012, 39 pages.

Yeh, T.-Y., et al., "Alternative implementations of two-level adaptive branch prediction", ACM SIGARCH Computer Architecture News—Special Issue: Proceedings of the 19th annual international symposium on Computer architecture (ISCA '92), May 1992, pp. 451-461, vol. 20, Issue 2.

* cited by examiner

PREDICTING INDIRECT BRANCHES USING PROBLEM BRANCH FILTERING AND PATTERN CACHE

FIELD

The present application relates generally to computers, microprocessors and computer architecture, and more particularly to indirect branch prediction in computer processors.

BACKGROUND

Indirect branch prediction provides performance improvements to many programs. A known system contains three tables for indirect branch prediction. These tables are also referred as count caches (for "branch to count instruction"). They include a local count cache indexed by instruction address storing predicted targets, a global count cache indexed by a combination of instruction address and global history vector storing predicted targets, and a selector table that decides which of the two tables (local or global) provides the prediction. Local selector may be incorporated in the local count cache. Global selector can be embedded in the global count cache.

Generally, prediction based on previous target can be performed by combining the previous target with the effective address (EA) and global history vector (GHV) hash. This may degrade prediction accuracy for the same number of entries as compared to count cache, and may require large number of entries for equivalent accuracy. A third count cache may be introduced that is indexed with the previous target. However, that may require a selector that chooses between local, global, and "previous target" count caches, resulting in longer time to make the correct selection, in addition to lower accuracy.

Recent performance data shows that indirect branch prediction is still important for programming languages, for example, interpreters of scripting languages such as Python. However, the known processor scheme might not be completely adequate for these predictions, for example, since only global history vector is used.

BRIEF SUMMARY

A method of predicting indirect branch instructions of a processor, in one aspect, may comprise predicting a target address for a fetched branch instruction. The method may also comprise tracking accuracy of the predicted target address. The method may further comprise flagging the fetched branch instruction responsive to determining as a result of the tracking that the fetched branch instruction is a problematic branch instruction. The method may also comprise starting training of a pattern cache for predicting more accurate target address for the fetched branch instruction. The method may further comprise predicting from the pattern cache, next time the fetched branch instruction is again fetched.

A system for predicting indirect branch instructions, in one aspect, may comprise a processor operable to predict a target address for a fetched branch instruction. The system may also comprise a mispredict table via which the processor is operable to track accuracy of the target address and flag the fetched branch instruction as a problematic branch instruction. The system may also comprise a pattern cache trained for predicting for the fetched branch instruction, the processor further operable to predict from the pattern cache, next time the fetched branch instruction is again fetched.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
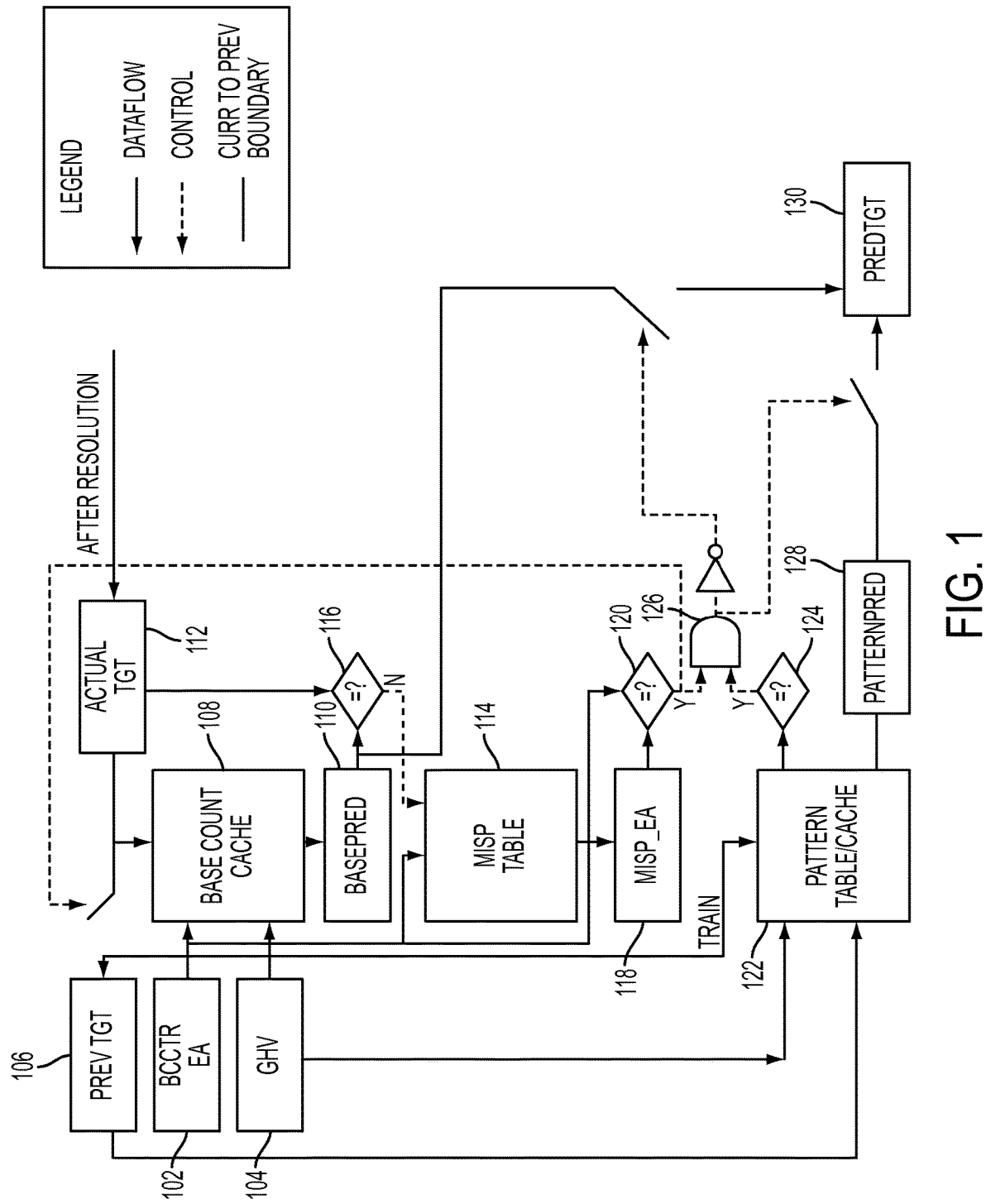
FIG. 1 illustrates a logical flow of a count cache in one embodiment of the present disclosure.

In one embodiment of the present disclosure, an enhanced scheme which captures prediction patterns that a global history vector cannot capture may be provided. The enhanced scheme of the present disclosure may include extra specialized components that augment the current branch target prediction methodology that uses a global history vector.

A prediction methodology with the enhanced scheme in one embodiment of the present disclosure may predict indirect branches in a computer processor. In this disclosure, the term "branch" and "branch instruction" is used interchangeably to refer to a branch instruction, a type of jump machine instruction, e.g., that may be found in a microprocessor instruction set. The processor may use a combination of the effective address of the branch instruction, branch direction history of previous branches, and previous targets to predict the current branch target. The predicted target may be checked against the actual target after the branch executes and a count cache may be updated. The result of the prediction (correct or incorrect) may be monitored by a mispredict table. If the mispredict table finds that the count cache is mispredicting a particular branch, the branch may be identified as a problem branch, e.g., by writing to memory, e.g., cache memory of a structure referred to herein as a pattern cache. As described in more detail below, a pattern cache may comprise an associated logic and memory. When the problem branch is fetched again, there is a match between the pattern cache and the problem branch, and subsequently the pattern cache starts learning the pattern of actual targets of the problem branch. When the pattern cache has learnt the pattern and the problem branch is fetched again pattern cache reports a pattern hit. Now the count cache prediction is ignored. In this way, the disclosed methodology may override the count cache and provides more accurate prediction.

In one embodiment of the present disclosure, the methodology that predicts indirect branches in a computer processor may add additional components to a conventional branch prediction scheme. The methodology may include, for example, adding tracking of mispredictions in a separate table (e.g., mispredict table); consulting the separate table in response to encountering the mispredicted branch again; and beginning to learn the pattern of targets at the branch; eventually the pattern cache is consulted when the branch is encountered, overriding action of the conventional scheme. In this way, space pressure on the first table (e.g., count cache) may be relieved by tracking frequently mispredicted branches in a separate structure, which may improve overall prediction accuracy.

The enhanced scheme of the present disclosure may include (a) a system that dynamically decides if a branch is hard-to-predict such that a specialized trainer component is used, (b) an extra pattern cache (or table) which trains based on a previous target combined with the global history, and (c) a system to decide which of the components will provide a prediction.

In the present disclosure, in one embodiment, a mechanism identifies problem bcctr(s) (or indirect branch instructions generally) and learns about that bcctr. Briefly, bcctr (Branch Conditional to Count Register) is a branch machine instruction found in a microprocessor instruction set. A tagged structure (e.g., a pattern cache) may be employed as a map from previous target to current target. Identifying problem bcctr(s) (or indirect branch instructions generally) may reduce learning space and tagged structure allows "unlearning" to be fast.

In one aspect, the present disclosure applies to indirect branches. Generally, branch instructions compute the effective address (EA) of the next instruction address for executing, referred to also as a target address. An indirect branch, a type of program control instruction of machine language instruction sets, specifies as argument (parameter) where the address of the next instruction to execute is located, rather than specifying directly the address of the next instruction to execute. The address to be jumped may not be known until the instruction is executed, e.g., because they may depend on the argument value and also the value of a memory location.

FIG. 1 illustrates a logical flow of a count cache in one embodiment of the present disclosure. Branch target prediction process may proceed as follows if no pattern learning and prediction of the present disclosure is incorporated. First, when a branch instruction is brought into a processor by an instruction fetch unit, a combination of the effective address of the branch instruction, branch direction history of previous branches, and previous targets is employed to predict the branch target. The predicted target is checked against the actual target after the branch executes and a count cache is updated. If the prediction is incorrect the processor pipeline is flushed and restarted, resulting in performance degradation.

With the pattern learning and prediction of the present disclosure in one embodiment, when a branch instruction is brought into the processor by the instruction fetch unit, a combination of the effective address of the branch 102, branch direction history of previous branches 104, and a previous target 106 is employed to predict the branch target. The predicted target 110 is checked against the actual target 112 after the branch executes and base count cache 108 is updated with the correct target that is known after the execution of the indirect branch instruction.

In addition, the result of the prediction (correct or incorrect) is monitored by a mispredict table 114 (e.g., referred to as Misp Table), e.g., as shown at 116. If the Misp Table 114 finds that the base count cache (CC) 108 is mispredicting a particular branch instruction (BCCTR EA), e.g., 102, this BCCTR EA is identified as a problem branch. The identified BCCTR EA is written to a storage element (e.g., referred to as MISP_EA) 118.

When the problem branch instruction is fetched again, a match is identified between an entry in the pattern cache 122, MISP_EA 118 and BCCTR EA 102. For instance, responsive to a branch instruction (e.g., 102) being fetched, the branch instruction may be compared with an entry in the storage structure 118, for example, as shown at 120. Since this branch was identified and written to the storage structure 118, match would be found. In response to the match being identified, a pattern cache 122 starts learning the pattern of actual target of the problem branch. In one embodiment of the present disclosure, the pattern cache 122 has storage for storing the correct target address and associated logic for: (1) responding with a hit or miss during lookup, and (2) for inserting the actual target during update. In one embodiment, the pattern cache 122 uses a combination of the effective address of the branch 102, branch direction history of previous branches 104, and a previous target 106 to learn the pattern of actual target of the problem branch.

When the pattern cache 122 has learnt the pattern (e.g., as shown at 124) and the problem branch is fetched again (e.g., shown at 120), the match between Pattern BCCTR EA and BCCTR EA is reported (e.g., shown as combination of both conditions at 126), and pattern cache 122 reports a Pattern Hit. For instance, shown at 120, entry in storage structure 118 may be compared with a currently fetched branch instruction 102 to determine whether that fetched branch instruction matches an entry in the storage structure 118; likewise, shown at 124, one or more learnt entries in the pattern cache 122 may be compared with the currently fetched branch instruction to determine whether that fetched branch instruction matches an entry in the pattern cache 122. If both conditions are satisfied (e.g., at 126), the CC prediction 110 (e.g., shown as BasePred) is ignored and the branch target that is learned, e.g., shown as PATTERNPRED at 128, is used as the predicted target address 130. In this way the disclosed mechanism overrides the CC (base count cache) and may provide more accurate prediction of difficult to predict branches.

Figure 2:
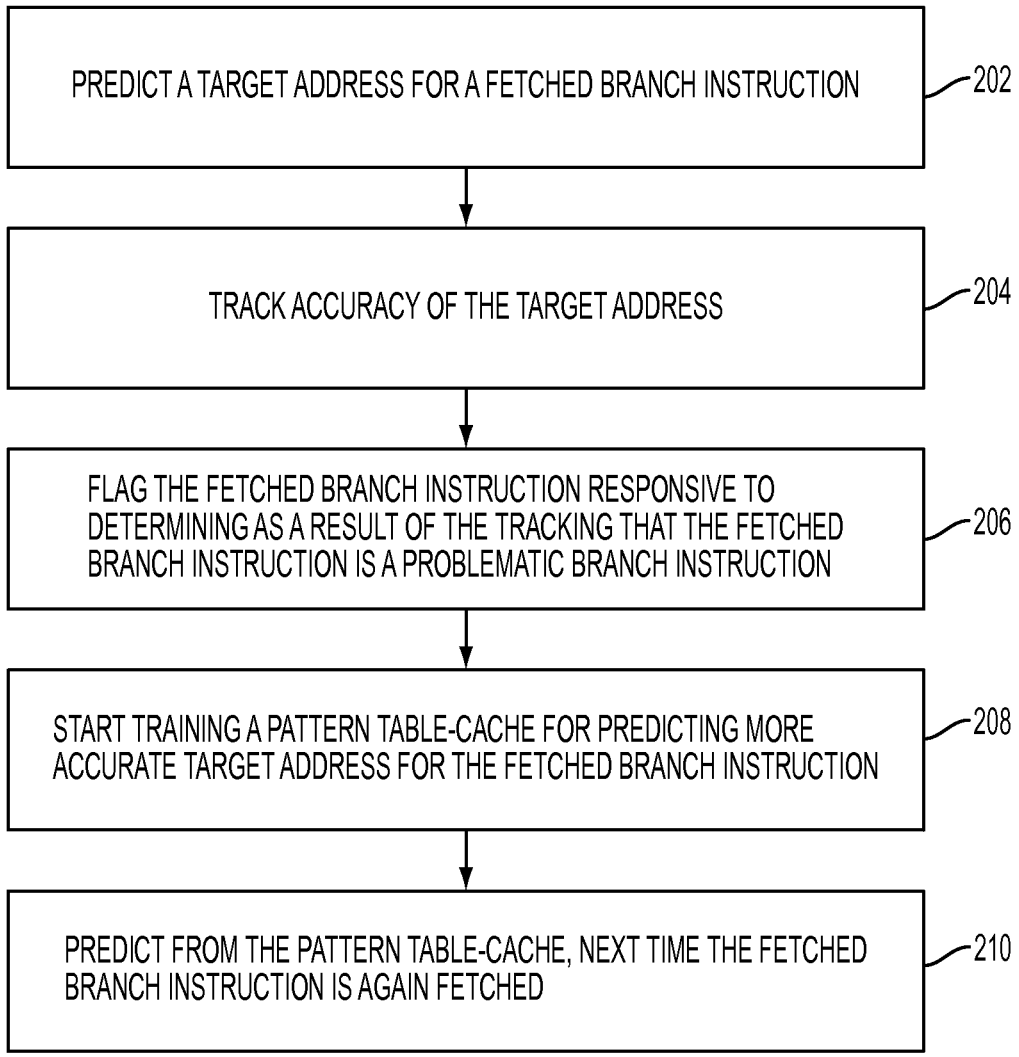
FIG. 2 is a flow diagram illustrating a method of the present disclosure in one embodiment.

FIG. 2 is a flow diagram illustrating a method of the present disclosure in one embodiment. At 202, start predicting a target address for a fetched branch instruction with the regular untagged CC 108. At 204, track prediction accuracy per EA (e.g., 102 in FIG. 1) in the Misp Table (e.g., 114 in FIG. 1). Misp (Mispredict) Table contains a plurality (e.g., N number) of indirect branch instructions (bcctrs) that were mispredicted by the Base Count Cache (108 in FIG. 1). When the misprediction count tracked by the Misp Table 114 for a particular bcctr reaches a threshold (which may be predefined), that bcctr is flagged as the problem bcctr and that bcctr's EA (effective address) is written into the storage structure 118. The content of this storage structure is used to compare the fetched BCCTR EA 102 to determine if a processor fetched the problem BCCTR. At 206, when the Misp Table 114 and associated logic on the processor flags a problematic branch instruction to a storage structure 118 (e.g., shown as MISP_EA) e.g., by writing to the pattern table: at 208, start training the Pattern Table/Cache 122 for predicting more accurate target address; at 210, next time the fetched branch instruction is again fetched, prediction may be done from the trained pattern table that learned more accurate target address. For example, check if the flagged branch (e.g., bcctr) instruction is fetched and if the GHV and previous (prev) target combination exists in the storage structure (e.g., 118 in FIG. 1). In one embodiment, the storage structure 118 may contain a combination of GHV and prev target. Generally, the storage structure 118 may contain one or more combinations of GHV, prev target, EA and prev GHV. In one embodiment of the present disclosure, the item shown at 118 in FIG. 1 is a storage element that contains the EA of the problem bcctr. If a branch instruction (e.g., bcctr or the like) is fetched and the branch effective address matches MISP_EA (e.g., 118 in FIG. 1) and pattern cache (e.g., 122 in FIG. 1), choose prediction (e.g., 128 in FIG. 1) provided by the pattern cache (e.g., 122 in FIG. 1) as a predicted target (e.g., 130 in FIG. 1).

Referring to FIG. 1, in one embodiment of the present disclosure, the base count cache 108 is an untagged structure and can be any count cache. In one embodiment of the present disclosure, the mispredict table 114 isolates a bcctr or the like branch instruction to track and learn pattern. The mispredict table in FIG. 1 may be direct mapped, set-associative, or n-way set associative.

In one embodiment of the present disclosure, pattern learning is performed by the pattern cache 122. The pattern cache 122 learns the pattern of targets of the branch instruction (e.g., bcctr) identified by the mispredict table 114. The pattern cache 122 may be implemented as a tagged structure and may provide a hit or miss signal for a key formed with some function of GHV and previous target. The function that forms the key may be a known function. The pattern cache 122 can be direct mapped, fully set associative, or n-way set associative.

Figure 3:
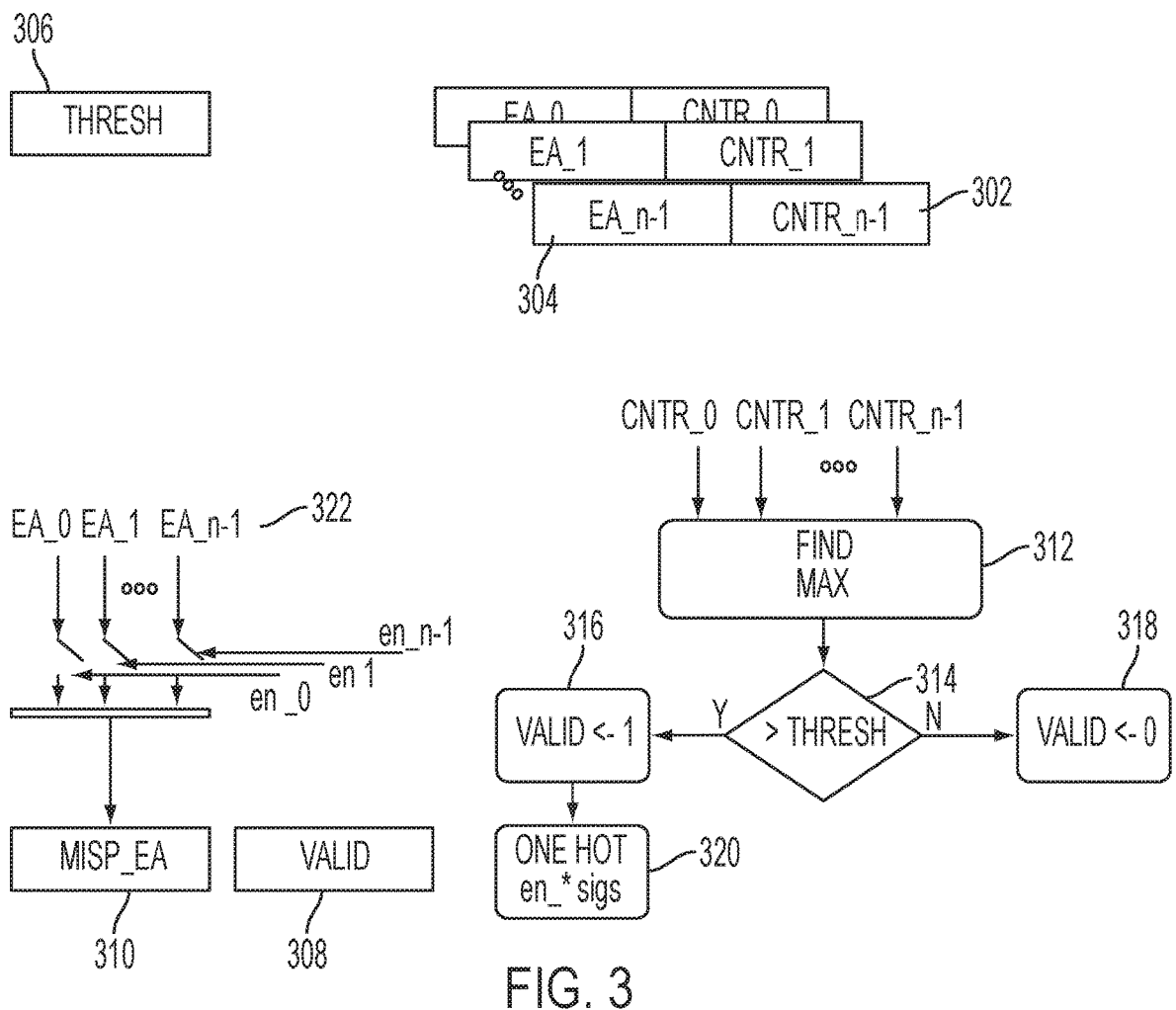
FIG. 3 illustrates a structure of a mispredict table of a microprocessor and identifying the most mispredicted EA by the mispredict table in one embodiment of the present disclosure.

FIG. 3 illustrates a structure of a mispredict table of a microprocessor and identifying the most mispredicted EA by the mispredict table in one embodiment of the present disclosure. CNTR_*302 represents a register or another storage element that stores counters to track misprediction and correct prediction. EA_*304 represents a register or another storage element, that stores effective address of branch instructions (e.g., bcctrs). The number of EA and associated counter value entries stored in the mispredict table may depend on the size of the table, which may be a design choice that may balance the available microprocessor resources and processing throughput or performance. THRESH 306 represents a register or another storage element that stores a counter (CNTR) value at and beyond which problem EA identification by mispredict table is considered valid. This value may be a user configurable value. VALID 308_represents a register or another storage element that stores a bit indicating if the results of the mispredict table are valid. MISP_EA 310 represents a register or another storage element that stores an EA of the most mispredicted branch instruction (e.g., bcctr) identified by the mispredict table. This MISP_EA 310 is a storage element, may be the same structure shown at 118 in FIG. 1.

At 312, an EA that has the highest counter value for misprediction may be identified. In this way, those branch instructions that are determined to be most problematic may be selected for candidates for learning. For example, a subset of branches tracked by the mispredict table may be identified as problem branches. In one embodiment of a specific implementation, there may be one bcctr identified as a problem branch. Generally, and in another embodiment of a methodology of the present disclosure, N problem branches may be identified from the branches that are tracked by the mispredict table. At 314, the counter value of the EA identified at 312 is compared with a threshold value, e.g., stored in THRESH 306. If the counter value exceeds a criterion, e.g., if the counter value is greater than the threshold value, a bit that indicates whether the results of the mispredict table are valid (e.g., VALID 308) is set (e.g., to 1) at 316 and one hot en_*sig is raised at 320, e.g., EA that exceeds the threshold value. This signal may be initially set to 0 for all EAs. Otherwise, if the counter value does not exceed the threshold value, at 318, the bit that indicates whether the results of the mispredict table are valid (e.g., VALID 308) is set to 0. Shown at 322, MISP_EA (also referred to as "Most Misp Branch EA") 310 stores the result of EAs combined with the corresponding one hot en_*sig, e.g., EA that exceeded the threshold value. This EA may be flagged as a problematic branch instruction and is written to the MISP_EA storage element 310. Pattern cache uses the content of the MISP_EA storage element 310 to identify and train on the target pattern of the bcctr identified by MISP_EA 310.

Figure 4:
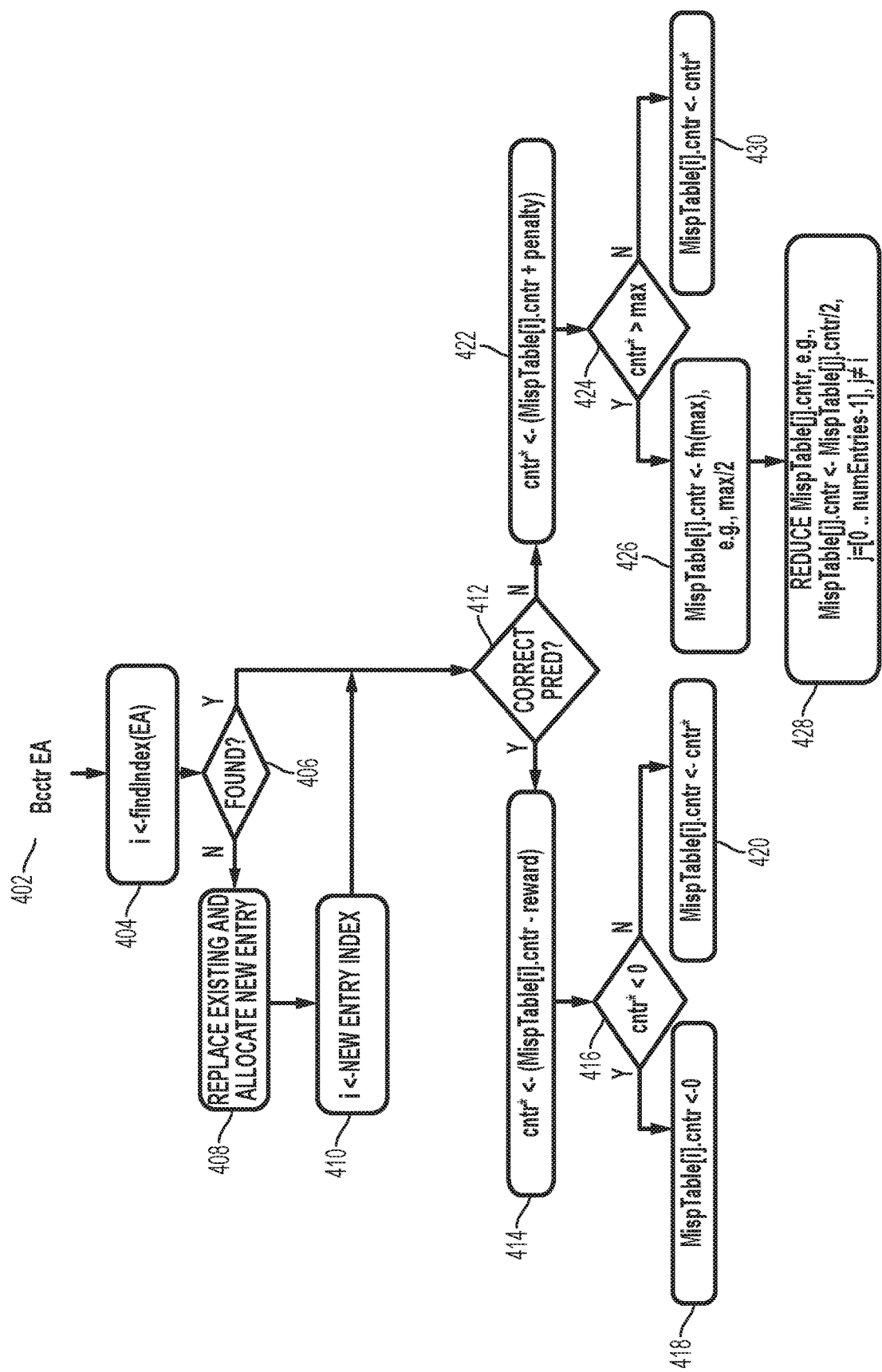
FIG. 4 illustrates a logic flow that updates mispredict counters in a mispredict table in one embodiment of the present disclosure.

FIG. 4 illustrates a logic flow that updates mispredict counters (e.g., 302 in FIG. 3) in a mispredict table in one embodiment of the present disclosure. At 402, a branch instruction (e.g., Bcctr EA) is received. At 404, an index in mispredict table is determined for this branch instruction mispredict table. It is determined whether this branch instruction, e.g., the effective address of the branch instruction is found in the determined index entry (e.g., index i) of the mispredict table. If at 406, the received branch instruction is found in the mispredict table, the logic proceeds to 412.

If at 406, the received branch instruction is not found in the mispredict table as indexed by the determined index entry, a new entry is allocated for this EA at 408, and the existing entry that is indexed by the determined index i, is replaced with the EA of the received branch instruction. At 410 an index is set to the new entry index. Existing entry is replaced at 408 since the space for counting the mispredictions for a particular bcctr may be finite; therefore, to contain the latest information, older information may be evicted. The logic proceeds to 412.

At 412, it is determined whether the prediction for this branch instruction is correct. This may be done by comparing the predicted target with the actual target of the branch instruction after the branch instruction has actually executed. If the prediction is correct, at 414, a counter associated with this branch instruction (e.g., counter at index i) is updated to reflect this correct prediction. For example, a temporary counter value (e.g., cntr*) may be set to the previous counter value stored in the mispredict table for this entry (e.g., MispTable[i].cntr) minus a predetermined reward value (e.g., reward). The reward value may be configurable. At 416, the temporary counter value is compared to a predetermined minimum value, e.g., zero. At 418, if the temporary counter value is less than the predetermined minimum value, e.g., zero, the counter entry in the mispredict table (e.g., MispTable[i].cntr) is updated to zero. At 420, if the temporary counter value is not less than the predetermined minimum value, e.g., zero, the counter entry in the mispredict table (e.g., MispTable[i].cntr) is set to the temporary counter value.

At 412, if the prediction is not correct, at 422, a counter associated with this branch instruction (e.g., counter at index i) is updated to reflect this misprediction. For example, a temporary counter value (e.g., cntr*) may be set to the previous counter value stored in the mispredict table for this entry (e.g., MispTable[i].cntr) plus a predetermined penalty value (e.g., penalty). The penalty value may be configurable. At 424, the temporary counter value is compared to a predetermined maximum value (e.g., "max"), which may be configurable. At 426, if the temporary counter value is greater than the predetermined maximum value, the counter entry in the mispredict table (e.g., MispTable[i].cntr) is updated to the value that is the function of the predetermined maximum value (e.g., max/2). At 428, for all other counter entries (j=[0 . . . numEntries−1], j not equal to i) in the mispredict table, the counter values are reduced by a predetermined number, e.g., the counter values of all other counter entries in the mispredict table are set to a value that is a function of their previous values respectively, for example, MispTable[j]cntr/2 as shown at 428. At 430, if the temporary counter value is not greater than the predetermined maximum value, the counter entry in the mispredict table (e.g., MispTable[i].cntr) is set to the temporary counter value.

Figure 5:
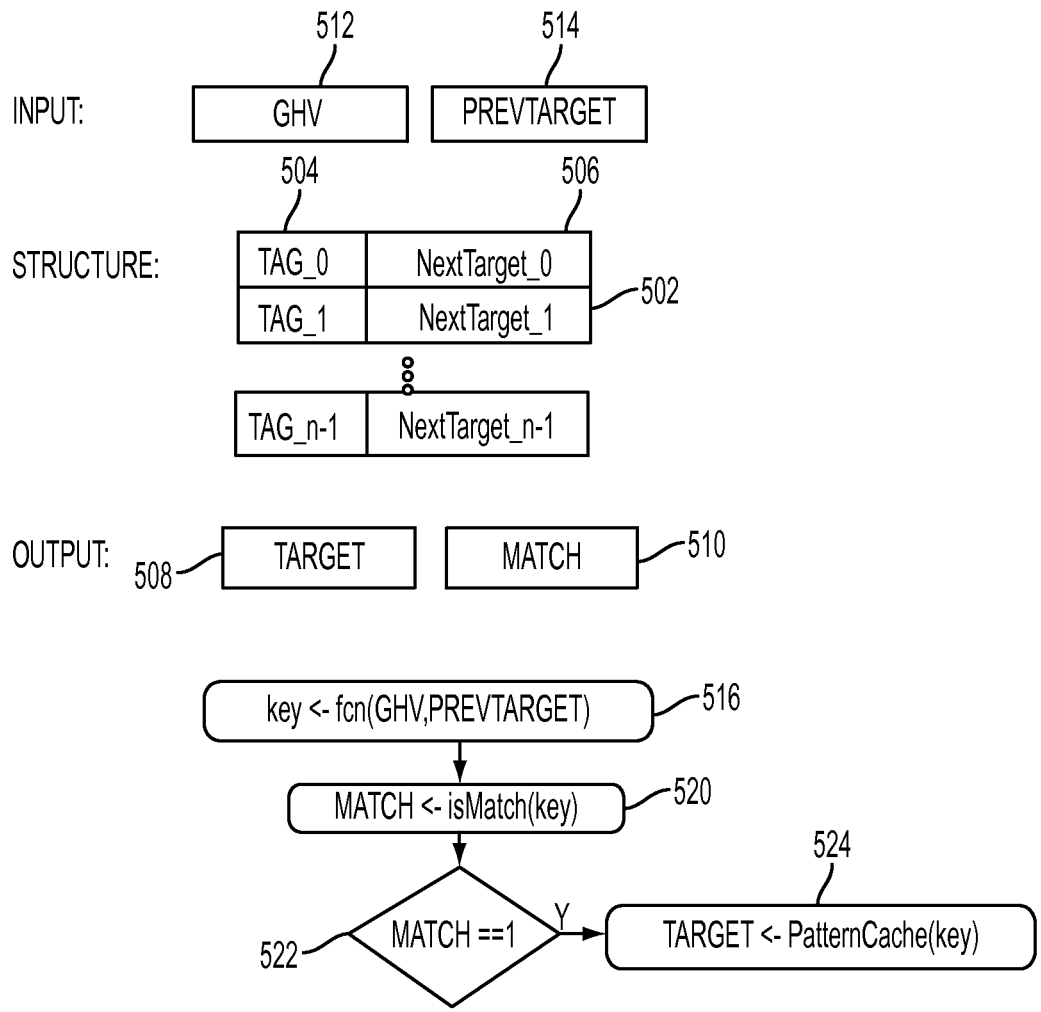
FIG. 5 illustrates a pattern cache and locating of the next target by the pattern cache in one embodiment of the present disclosure.

FIG. 5 illustrates a pattern cache and locating of the next target by the pattern cache. A pattern cache (e.g., shown in FIG. 1 at 122) may include a map or mapping of tags and next targets (target address of the branch instruction to which the program counter will jump to execute). An example structure of the pattern cache is shown at 502. The pattern cache maps from TAG_*504 to NextTarget_*506. The pattern cache's entry comprises a tag and a corresponding target address pair. The pattern cache may comprise a multiple of tag and target address pairs as entries. TAG_*504 represents a register or another storage element on a processor, for each tag entry, that stores a key formed with a combination of GHV and previous target, for each tag entry. NextTarget_*506 represents a register or another storage element on a processor, for each tag entry, that stores a predicted next target corresponding to the tag that is used as a key to the pattern cache structure. TARGET 508 represents a register or another storage element on a processor that holds or stores a value for the predicted target. MATCH 510 represents a register or another storage element on a processor that holds or stores a value as to whether a mapping is found in the pattern cache structure.

The pattern cache receives GHV 512 and previous target 514 as input values. For locating the next target, for example, responsive to identifying a problematic branch and the pattern table learning (e.g., condition at 126 in FIG. 1 is satisfied), the following logic may follow: At 516, a key is computed based on the input values of GHV and previous target. At 520, a match function determines whether the computed key is found in the pattern cache, e.g., matches one of the tag entries (e.g., 504). At 522, if match is found, the predicted target is set at 524 to the NextTarget (e.g., 506) that is mapped to the tag (e.g., 504) identified by the computed key. If there is no match found at 522, a predicted target might not be provided at this time; instead learning may begin or continue, to learn a predicted target for this input.

Figure 6:
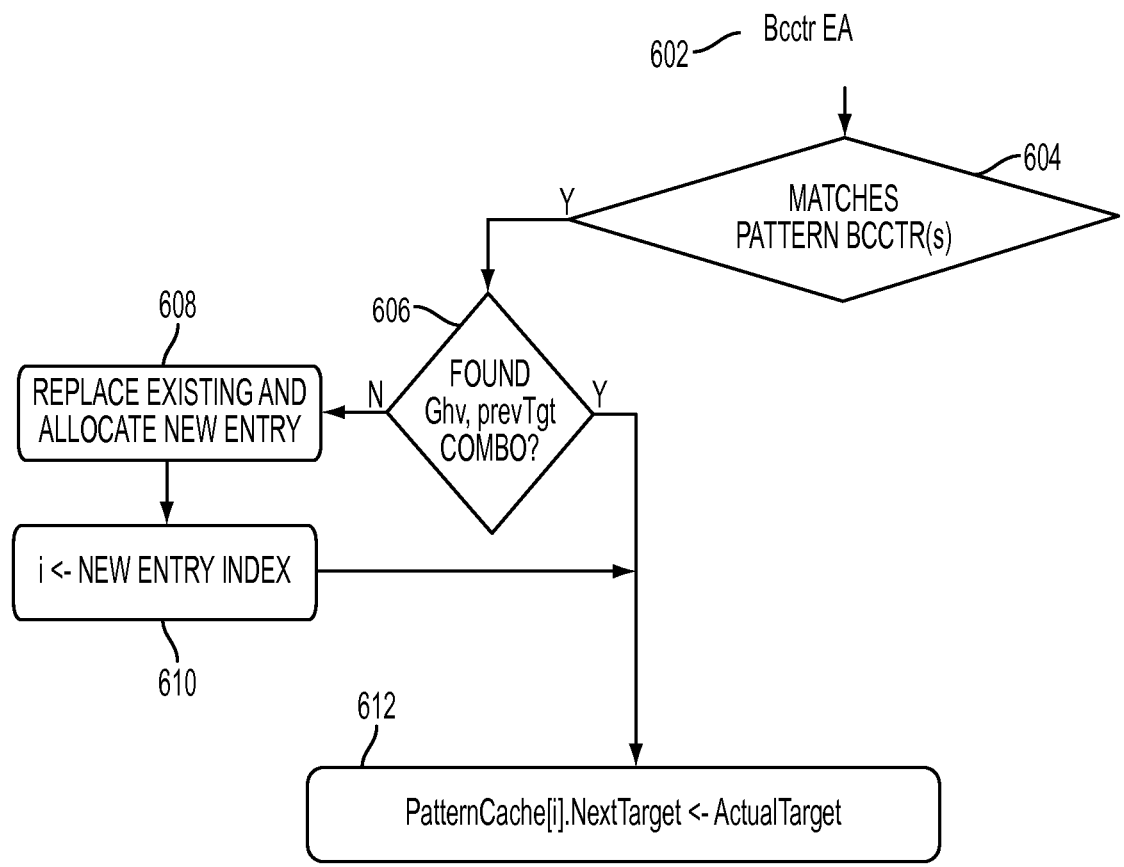
FIG. 6 illustrates a flow logic in which a pattern table learns and updates its pattern cache in one embodiment of the present disclosure.

FIG. 6 illustrates a flow logic in which a pattern cache learns and updates its contents in one embodiment of the present disclosure. This flow logic may take place in response to the mispredict table identifying a problematic branch and writing to a storage structure in FIG. 1 at 118. At 602, a branch instruction (e.g., Bcctr EA) is received. This branch instruction 602 may be one that is identified as a problematic branch, e.g., because the mispredict table has identified it as having many incorrect predictions that exceeded a threshold. Hence, at 604, it is determined whether the branch instruction matches one of the mispredicted branch instruction entries (e.g., stored in a storage structure, e.g., shown in FIG. 1 at 118). If not, the logic ends or returns to its caller. If there is a match between the received branch instruction and the storage structure entry, at 606, it is determined whether the input GHV and previous target combination of the pattern cache is found in the pattern cache structure. For example, a key may be computed that is a function of this input GHV and previous target combination. If the computed key matches one of the tag entries in the pattern cache, this input GHV and previous target combination is considered found. If the input GHV and previous target combination is not found, at 608 new entry is allocated and an existing entry is replaced with the new entry. For instance, in one embodiment, an existing entry is replaced to retain the latest information. There can be various different algorithms to find an entry to replace. One method of finding an entry to replace is to replace the entry pointed to by the index computed with the GHV and previous target. At 610, an index is set to the allocated new entry index. At 612, the indexed entry of the pattern cache is set to the actual target. If at 606, the input GHV and previous target combination is found, then the logic proceeds to 612.

As described above, a method in one embodiment identifies a problematic branch instruction using a mispredict table. Using a previous target address and GHV reduces extra path length caused by matching. The method may hash the previous target and GHV to reduce pressure in the pattern cache. The method also may combine the count cache, misp table, and pattern table to generate accurate predictions. The methodology of the present disclosure, in one aspect, may use feedback from run time information to detect patterns and dynamically improve branch prediction. For example, the methodology in one embodiment may make a prediction based on dynamically monitored behavior. In another aspect, the methodology in one embodiment of the present disclosure may improve one indirect branch at a time by detecting multiple repeated sequences of targets for the indirect branch and choosing the next target based on the value of the previous target. Still yet, the methodology in one embodiment of the present disclosure may use the target addresses themselves to detect patterns used for prediction independent of path. Since in one embodiment, the methodology may be only active for one indirect branch program address at a time, there may be no need to store information based on instruction address either.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of predicting indirect branch instructions of a processor, comprising:
   predicting, by the processor, a target address for a fetched branch instruction from a count cache;
   tracking, by the processor, accuracy of the target address;
   flagging, by the processor, the fetched branch instruction responsive to determining based on the tracking that the fetched branch instruction is a problematic branch instruction;
   starting training of a pattern cache for predicting a more accurate target address for the fetched branch instruction, the pattern cache structured to include a tag and a corresponding target address; and
   next time the fetched branch instruction is fetched, performing a step of predicting from the pattern cache, overriding the count cache's prediction, wherein the predicting from the pattern cache includes searching the pattern cache for a matching tag given a global history vector and a previous target address;
   wherein the tracking of the accuracy of the target address comprises storing in a table a count value associated with the fetched branch instruction,
   wherein if the predicting from the count cache is determined to be a correct prediction, the count value is determined by:
      setting a temporary counter value to a previous count value minus a predetermined reward value;
      comparing the temporary counter value to a predetermined minimum value;
      if the temporary counter value is less than the predetermined minimum value, setting the count value to zero;
      if the temporary counter value is not less than the predetermined minimum value, setting the count value to the temporary counter value;
   wherein if the predicting from the count cache is determined to be a misprediction, the count value is determined by:
      setting the temporary counter value to the previous counter value plus a predetermined penalty value;
      comparing the temporary counter value to a predetermined maximum value;
      if the temporary counter value is greater than the predetermined maximum value, setting the count value to the predetermined maximum value divided by 2, and reducing all other count values stored in the table by ½;
      if the temporary counter value is not greater than the predetermined maximum value, setting the count value to the temporary counter value,
   the method further including maintaining a storage element external to the table, the storage element storing a most mispredicted effective branch address among entries in the table, wherein content of the storage element is identified as the problematic branch instruction for training in the pattern cache, wherein responsive to the count value stored in the table exceeding a threshold value, raising a signal corresponding to an address associated with the count value that exceeds the threshold value, causing the address to be written to the storage element.

2. The method of claim 1, wherein the training of a pattern cache comprises storing an actual target address in an entry associated with the fetched branch instruction in the pattern cache after the fetched branch instruction executes on the processor.

3. The method of claim 1, wherein the problematic branch instruction is determined based on a further criterion of whether the count value associated with the fetched branch instruction is highest among other count values associated with other branch instructions.

4. A system for predicting indirect branch instructions, comprising:
   a processor operable to predict a target address for a fetched branch instruction from a count cache;
   the processor further comprising a mispredict table via which the processor is operable to track accuracy of the target address and flag the fetched branch instruction as a problematic branch instruction; and
   the processor further comprising a pattern cache trained for predicting for the fetched branch instruction, the pattern cache structured to include a tag and a corresponding target address, and next time the fetched branch instruction is fetched the processor further operable to predict from the pattern cache, overriding the count cache's prediction, wherein the processor predicting from the pattern cache includes the processor searching the pattern cache for a matching tag given a global history vector and a previous target address,
   wherein the mispredict table comprises a count value associated with the fetched branch instruction,
   wherein if the target address predicted from the count cache is a correct prediction, the processor determines the count value by:
      setting a temporary counter value to a previous count value minus a predetermined reward value;
      comparing the temporary counter value to a predetermined minimum value;
      if the temporary counter value is less than the predetermined minimum value, setting the count value to zero;
      if the temporary counter value is not less than the predetermined minimum value, setting the count value to the temporary counter value;
   wherein if the target address predicted from the count cache is a misprediction, the processor determines the count value by:
      setting the temporary counter value to the previous counter value plus a predetermined penalty value;
      comparing the temporary counter value to a predetermined maximum value;
      if the temporary counter value is greater than the predetermined maximum value, setting the count value to the predetermined maximum value divided by 2, and reducing all other count values stored in the mispredict table by ½;
   if the temporary counter value is not greater than the predetermined maximum value, setting the count value to the temporary counter value,
   the processor further operable to maintain a storage element external to the mispredict table, the storage element storing a most mispredicted effective branch address among entries in the mispredict table, wherein content of the storage element is identified as the problematic branch instruction for training in the pattern cache, wherein responsive to the count value stored in the mispredict table exceeding a threshold value, the processor further operable to raise a signal corresponding to an address associated with the count value that exceeds the threshold value, causing the address to be written to the storage element.

5. The system of claim 4, wherein the pattern cache is trained to store an actual target address in an entry associated with the fetched branch instruction in the pattern cache after the fetched branch instruction executes on the processor.

6. A computer readable storage medium storing a program of instructions executable by a machine to perform a method of predicting indirect branch instructions of a processor, the method comprising:
- predicting, by the processor, a target address for a fetched branch instruction from a count cache;
- tracking, by the processor, accuracy of the target address;
- flagging, by the processor, the fetched branch instruction responsive to determining based on the tracking that the fetched branch instruction is a problematic branch instruction;
- starting training of a pattern cache for predicting a more accurate target address for the fetched branch instruction, the pattern cache structured to include a tag and a corresponding target address; and
- next time the fetched branch instruction is fetched, performing a step of predicting from the pattern cache, overriding the count cache's prediction, wherein the predicting from the pattern cache includes searching the pattern cache for a matching tag given a global history vector and a previous target address;
- wherein the tracking of the accuracy of the target address comprises storing in a table a count value associated with the fetched branch instruction,
- wherein if the predicting from the count cache is determined to be a correct prediction, the count value is determined by:
  - setting a temporary counter value to a previous count value minus a predetermined reward value;
  - comparing the temporary counter value to a predetermined minimum value;
  - if the temporary counter value is less than the predetermined minimum value, setting the count value to zero;
  - if the temporary counter value is not less than the predetermined minimum value, setting the count value to the temporary counter value;
- wherein if the predicting from the count cache is determined to be an incorrect prediction, the count value is determined by:
  - setting the temporary counter value to the previous counter value plus a predetermined penalty value;
  - comparing the temporary counter value to a predetermined maximum value;
  - if the temporary counter value is greater than the predetermined maximum value, setting the count value to the predetermined maximum value divided by 2, and reducing all other count values stored in the table by ½;
  - if the temporary counter value is not greater than the predetermined maximum value, setting the count value to the temporary counter value,
- the method further including maintaining a storage element external to the table, the storage element storing a most mispredicted effective branch address among entries in the table, wherein content of the storage element is identified as the problematic branch instruction for training in the pattern cache, wherein responsive to the count value stored in the table exceeding a threshold value, raising a signal corresponding to an address associated with the count value that exceeds the threshold value, causing the address to be written to the storage element.

7. The computer readable storage medium of claim 6, wherein the training of a pattern cache comprises storing an actual target address in an entry associated with the fetched branch instruction in the pattern cache after the fetched branch instruction executes on the processor.

8. The computer readable storage medium of claim 6, wherein the problematic branch instruction is determined based on a further criterion of whether the count value associated with the fetched branch instruction is highest among other count values associated with other branch instructions.

* * * * *